United States Patent [19]

Lentz

[11] B 3,990,009
[45] Nov. 2, 1976

[54] METHOD AND APPARATUS FOR UNIQUELY ENCODING CHANNELS IN A DIGITAL TRANSMISSION SYSTEM

[75] Inventor: George Howard Lentz, Andover, Mass.

[73] Assignee: Bell Telephone Laboratories, Incorporated, Murray Hill, N.J.

[22] Filed: Mar. 14, 1975

[21] Appl. No.: 558,220

[44] Published under the second Trial Voluntary Protest Program on January 27, 1976 as document No. B 558,220.

[52] U.S. Cl. .............................. 325/40; 325/41; 340/146.1 BE; 340/147 SC
[51] Int. Cl.² ........................................ H03K 13/32
[58] Field of Search .......... 179/15 BY, 15 A, 15 AE, 179/15 BF; 325/2, 3, 38 R, 40, 41, 42, 65; 178/50, 53.1 R, 68, 69 R; 343/201, 202; 340/147 SC, 167 R, 146.1 AB, 146.1 B, 146.1 BE

[56] References Cited
UNITED STATES PATENTS

| 3,069,482 | 7/1963 | Frank et al. .......................... 325/41 |
|---|---|---|
| 3,128,342 | 4/1964 | Baker ................................. 178/66 |
| 3,128,343 | 4/1964 | Baker ................................. 178/67 |
| 3,500,207 | 3/1970 | Ruthroff ............................. 325/60 |
| 3,646,516 | 2/1972 | Flinders et al. ............. 340/146.1 BE |
| 3,665,395 | 5/1972 | Bochmann ....................... 325/41 X |
| 3,665,430 | 5/1972 | Hinrichs et al. ........... 340/146.1 BE |

*Primary Examiner*—Benedict V. Safourek
*Attorney, Agent, or Firm*—Bryan W. Sheffield

[57] ABSTRACT

In a digital transmission system of the type which employs cross-polarized radio channels, the failure of a transmitter associated with a particular channel can cause an undesired signal cross-over into the receiver of the failed channel. According to the instant invention, each channel in the system is uniquely encoded by a combination of bitstream inversion and bitstream delay at the head end of the system. Thus, if a signal crossover occurs an excessive number of parity violations are detected in the failed channel and a switch to a protection channel is requested.

7 Claims, 4 Drawing Figures

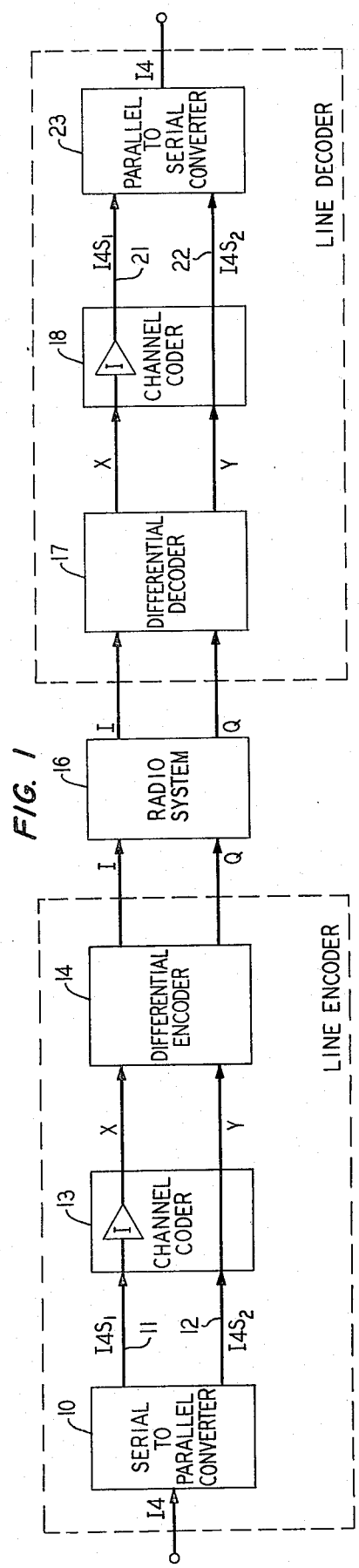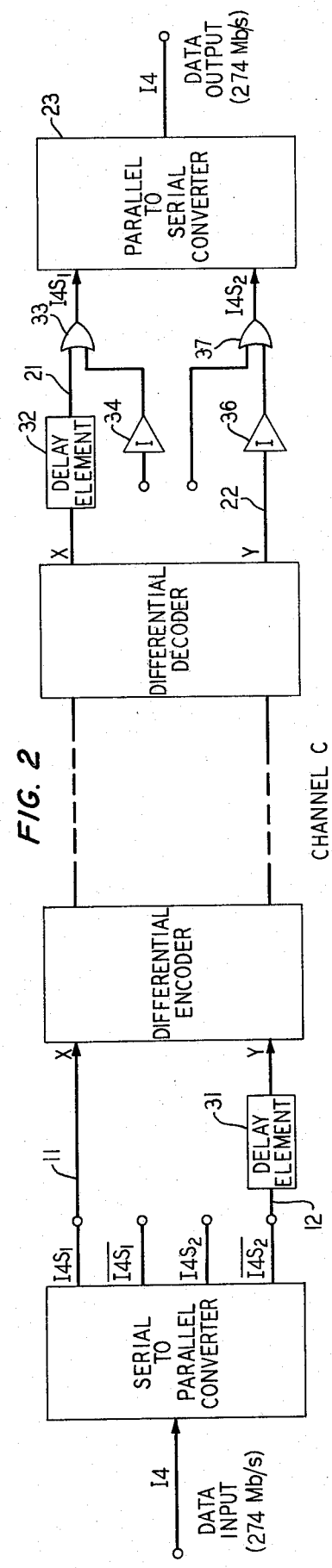

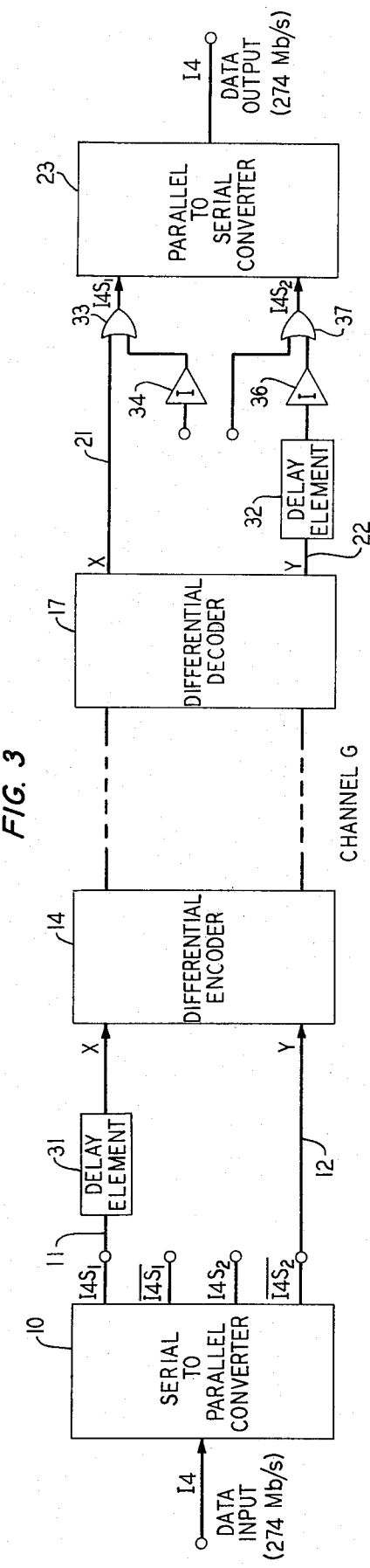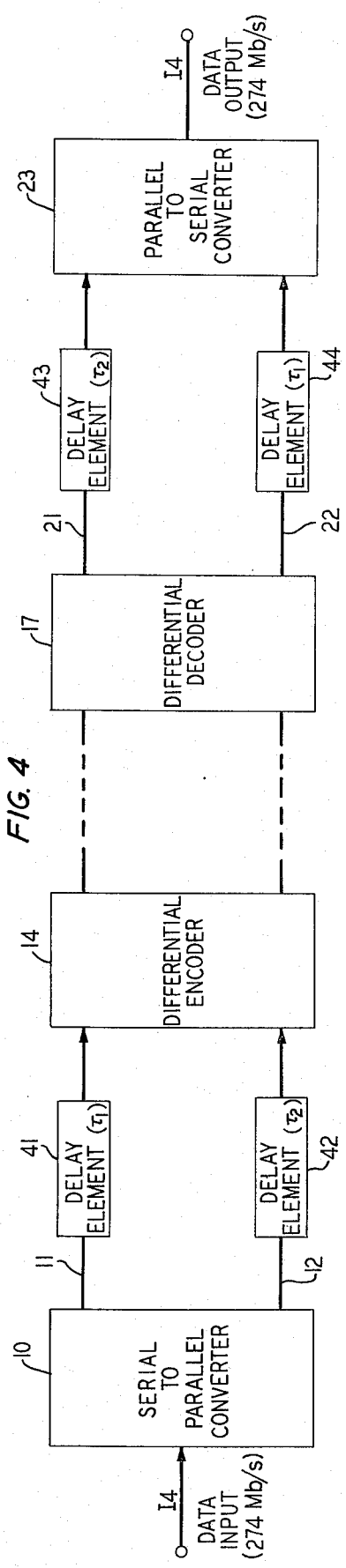

METHOD AND APPARATUS FOR UNIQUELY ENCODING CHANNELS IN A DIGITAL TRANSMISSION SYSTEM

BACKGROUND OF THE INVENTION

1. Field of the Invention

Broadly speaking, this invention relates to microwave communication. More particularly, in a preferred embodiment, this invention relates to methods and apparatus for preventing accidental signal transfers between cross-polarized channels in a microwave communication system.

2. Discussion of the Prior Art

To reduce the bandwidth requirements of microwave communication systems it is known to employ cross-polarized radio channels operating on the same carrier frequency. By careful system design, the discrimination between such cross-polarized channels can be made greater than 20 dB, which is more than adequate for digital transmission systems.

For example, the 18 GHz digital radio system known in the industry as DR-18, derives seven working channels and one protection channel in each direction using only four carrier frequencies. Each such orthogonally polarized channel can carry up to 4032 voice circuits using pulse code modulation (PCM) to a rate of 274 Mb/s.

A problem arises, however, when one of the working transmitters fails. Normally, when the path loss at a particular frequency becomes excessive, for example due to heavy rain or fog, the violation monitor associated with the far-end protection switching equipment will detect an excessive number of parity violations and/or an "out-of-frame" condition and will initiate a switch to the protection channel. However, if only one of the two transmitters operating on a particular frequency fails, the corresponding far-end receiver will detect the cross-polarized signal transmitted by the other transmitter. Although this undesired signal will be some 20 dB lower than normal, it is, nevertheless, well within the 40 dB fade margin designed into the DR-18 system. Thus, the substantially lower amplitude of the received signal will not, per se, initiate a protection switch at the far-end receiver.

An additional problem is that because the bitstream received from the distant transmitter has the correct format, it will propagate through the system on the failed channel and be accepted by the far-end violation monitor, which, thus, will also fail to initiate a protection switch to the spare channel. Furthermore, since the digital signal is intelligible after demultiplexing, a loss of transmission security will result on the orthogonally polarized channel.

One solution to this problem would be to provide a lockout circuit for each receiver in the system. This lockout circuit would compare the AGC voltage from its own receiver with the AGC voltage from the receiver of the corresponding orthogonally polarized signal. When the difference in AGC voltages was sufficiently large, the regenerator of the failed channel would be locked, effectively preventing detection of the transferred digital bitstream.

With this arrangement, each receiver in the system requires its own lockout circuit as well as an interconnection to the corresponding orthogonally polarized receiver. Since a typical microwave route will include several intermediate receiver-transmitter pairs, the possibility of good channel being erroneously blocked by a failure of the lockout circuit is quite high.

SUMMARY OF THE INVENTION

I have discovered that a superior solution to this problem is to encode each channel in the system in a unique way at the head end of each switching section and then to decode the channels in the inverse way at the far-end, which, of course, does not require additional circuitry for each receiver. With this approach, if a signal cross-over occurs between a working and a failed channel, the coding corresponding to the transferred digital signal will disagree with the decoder at the receiving end resulting in a sufficient number of parity errors to cause a switch request. Thus, circuits are required only at the terminating ends of the system and not at each intermediate receiver, which reduces cost while increasing reliability.

In a first embodiment of the invention the coding of the channels is accomplished by splitting the data signal associated with each channel into two rails and then selectively inverting the polarity of one or both rails with respect to a reference channel in which neither rail is inverted. In a second embodiment of the invention, the coding is accomplished by inverting and/or delaying one or other of the rails with respect to a reference channel. In a third embodiment both rails are delayed but by differing amounts.

The invention and its mode of operation will be more fully understood from the following detailed description, when taken with the appended drawings, in which:

DESCRIPTION OF THE DRAWINGS

FIG. 1 is a schematic diagram of a first embodiment of the invention wherein the polarity of one or more of the data rails is inverted;

FIG. 2 is a schematic diagram of a second embodiment of the invention wherein one of the data rails is inverted and time-delayed with respect to the other;

FIG. 3 is a schematic diagram of another implementation of the second embodiment wherein one of the data rails is inverted and the other rail delayed with respect to the first; and FIG. 4 is a schematic diagram of a third embodiment of the invention wherein both rails of a given channel are delayed, but by unequal amounts.

DETAILED DESCRIPTION OF THE INVENTION

The following detailed description makes reference to a particular microwave system and a particular bitstream format. One skilled in the art will appreciate, however, that the invention is not so limited and may be employed with any digital radio system employing cross-polarized channels operating on a common carrier frequency.

FIG. 1 depicts an illustrative line encoder/decoder, for example the encoder/decoder employed in the DR-18 digital radio system, as modified according to the invention. As shown, an I4 bitstream at 274 Mb/s is applied to the input of a serial-to-parallel converter 10 which splits the bitstream into two 137 Mb/s bistreams, I4S$_1$/I4S$_2$, on two parallel "rails" 11 and 12, respectively.

The commonly assigned, copending application of W. H. Bleickardt and R. B. Robrock, II, Ser. No. 450,203, filed Mar. 11, 1974, now U.S. Pat. No. 3,872,257, dated Mar. 18, 1975, which application is hereby incorporated by reference, explains in considerable detail the format of the I4 and I4S bitstreams. A complete understanding of the format of these bitstreams is not necessary for an understanding of the instant invention. Suffice it to say that the I4 bitstream has the following format:

$$I4 = \ldots S\bar{S}\ 96I\ P_1P_1\ 96I\ \bar{S}S\ 96I\ P_2P_2 \ldots,$$

where S and $\bar{S}$ are complementary terminal control bits related primarily to pulse stuffing information, $P_1$, $P_2$, etc., are terminal control bits related to parity control and the I bits represent data. Thus, a single I4 frame has the format:

$$|S\bar{S}\ 96I\ PP\ 96I|,$$

with the two P bits being positioned midway between the complementary S bits of the current frame and the complementary S bits of the succeeding frame.

In the illustrative DR-18 system, a superframe of data comprises 24 successive frames. The 24 bit word defined by the complementary S bits in each superframe includes marker bits to enable the demultiplexer at the far-end to frame on the superframe, X bits for the transmission of command instructions relating to protection switching and C bits to provides stuffing information for each of the six 45 Mb/s input channels which are multiplexed at the transmitting end to generate the 274 megabits I4 bitstream.

More specifically, the 24 bit S word has the format:
$$S = M_1\ M_2\ M_3\ X_1\ X_2\ X_3\ C_{11}\ C_{12}\ C_{13} \ldots C_{i1}\ C_{i2}\ C_{i3} \ldots C_{61}\ C_{62}\ C_{63}$$

The marker bits, $M_1\ M_2\ M_3$, permanently define the binary word "101". It is the detection of this fixed pattern which enables the demultiplexer to frame on the superframe. In like manner the X bits, $X_1\ X_2\ X_3$, permanently define the binary word "000" or "111" and provide two command instructions which are available for line protection switching or similar functions. The C bits, $C_{i1}\ C_{i2}\ C_{i3}$, define the binary word 000 when no stuffing is required and 111 when stuffing is required in the $i^{th}$ channel.

Returning now to FIG. 1, the two 137 Mb/s bitstreams, $I4S_1$ and $I4S_2$,:
$$I4S_1 = S\ 48I_o\ P_1\ 48I_o\ S\ 48I_o\ P_2 \ldots$$
$$I4S_2 = \bar{S}\ 48I_E\ P_1\ 48I_E\ \bar{S}\ 48I_E\ P_2 \ldots,$$

are fed, via "rails" 11 and 12, to a channel coder 13 where they are encoded in a manner to be described more fully below.

The encoded bitstreams, now designated as X and Y, are next fed to an encoder 14 which, in the illustrative DR-18 system, is a four-phase encoder using differential phase-shift keying, for example, the encoder shown in U.S. Pat. No. 3,128,342 which issued Apr. 7, 1964 to P. A. Baker. The output of the encoder is connected to a channel of the microwave system, illustratively designated as 16.

In the line decoder at the far-end of the system the corresponding T and Q outputs from radio system 16 are applied to a four-phase differential decoder 17, for example, the decoder shown in U.S. Pat. No. 3,128,343 which issued Apr. 7, 1964 to P. A. Baker which performs the inverse operation priorly performed by differential encoder 14. One skilled in the art will appreciate, however, that the invention is not limited to any particular modulation scheme and differential phase-shift keying is only exemplary.

The outputs of decoder 17, now designated X and Y, are next applied to a channel decoder 18 which performs the inverse function of the channel coder 13 at the other end of the system. Finally, the $I4S_1$ and $I4S_2$ bitstreams, on rails 21 and 22, are recombined in a parallel-to-serial converter 23 to yield the desired I4 bitstream.

It should be noted that it is not essential to perform the channel coding at the $I4S_1/I4S_2$ level, as shown in FIG. 1. If desired the channel coder could be placed before serial-to-parallel converter 10, however, because the bit rate of the $I4S_1/I4S_2$ bitstream in one-half the bit rate of the I4 bitstream, the encoding is somewhat easier to implement if carried out at the $I4S_1/I4S_2$ level.

In a first embodiment of the invention channel coder 13 encodes the channels of the radio system by inverting either the $I4S_1$ signal, the $I4S_2$ signal, or both. In the line decoder at the far-end of the system, decoder 18 is arranged to perform the inverse operation which restores the signals to their original condition if, and only if, they were received on the correct channel.

This arrangement leads to four possible codes:

| Channel | X | Y |
| --- | --- | --- |
| A | $I4S_1$ | $I4S_2$ |
| B | $\overline{I4S_1}$ | $I4S_2$ |
| C | $I4S_1$ | $\overline{I4S_2}$ |
| D | $\overline{I4S_1}$ | $\overline{I4S_2}$ | and the ability to code four different channels.

With the illustrative DR-18 system this coding can readily be implemented at the transmitting location within serial-to-parallel converter 10 which fortuitously has complementary outputs available. At the distant end of the system, however, additional equipment, for example, NOR-gates and inverters, will be required before the bitstreams are connected to the parallel-to-serial converter. Similar equipment will be required at the transmitting end if the invention is used with digital radio systems other than DR-18.

In the above-described scheme four possible digital signals can occur at the input to parallel-to-serial converter 23. The normal signal, which is assumed to be $I4S_1/I4S_2$ will be acceptable to the violation monitor. However, any of the other combinations:
$$\overline{I4S_1}/I4S_2,\ I4S_1/\overline{I4S_2},\ \text{or}\ \overline{I4S_1}/\overline{I4S_2},$$
which can only result from a transmitter failure and a resulting digital signal cross-over, will be rejected by the violation monitor and cause a request for a switch to the protection channel.

As previously discussed, the normal signals at the input to parallel-to-serial converter 23 have the following format:
$$I4S_1 = S\ 48I_o\ P_1\ 48I_o\ S\ 48I_o\ P_2 \ldots$$
$$I4S_2 = \bar{S}\ 48I_E\ P_1\ 48I_E\ \bar{S}\ 48I_E\ P_2 \ldots.$$

After interleaving in the parallel-to-serial converter the signal becomes:
$$I4 = \ldots S\bar{S}\ 96I\ P_1P_1\ 96I\ \bar{S}S\ 96I\ P_2P_2 \ldots.$$

In the violation monitor, the signal is again split into the $I4S_1$ and $I4S_2$ bitstreams for the purpose of parity checking and to extract the previously discussed line protection X bits. The frame is found by locating the alternating pattern of complementary pairs $S\bar{S}$ and equal pairs PP of terminal control bits. Once the frame has been found, the superframe can be located by finding the unique marker $M_1\ M_2\ M_3 = 101$ contained in each 24 bit S word. As explained more fully in the above-referenced copending application of W. H. Bleickardt and R. B. Robrock, II, the parity $P_1$ is taken over the information bits contained within two successive frames (192) bits of the $I4S_1$ signal while the parity $P_2$ is similarly taken over two successive frames of the I4S$_2$ signal. The parity bit P$_1$, or P$_2$, will be zero if the number of binary 1's within the 192 information bits is even. The violation monitor of the DR-18 system is designed in such a manner that it will not mark a channel as "good" unless it simultaneously obtains frame, superframe, and an adequately low rate of parity violations. In a trouble condition, i.e., where a transmitter has failed and the bitstream from the corresponding transmitter on the same frequency assignment is received at the far-end of the system, three signal combinations are possible in the violation monitor:

Case I
$$\overline{I4S_1} = ...\overline{S\ 48I_o\ P_1\ 48I_o\ S\ 48I_o\ P_2}....$$
$$I4S_2 = ...\overline{S}\ 48I_E\ P_1\ 48I_E\ \overline{S}\ 48I_E\ P_2....$$

Case II
$$I4S_1 = ...S\ 48I_o\ P_1\ 48I_o\ S\ 48I_o\ P_2....$$
$$\overline{I4S_2} = ...S\ \overline{48I_E}\ \overline{P_1}\ \overline{48I_E}\ S\ \overline{48I_E}\ \overline{P_2}....$$

Case III
$$I4S_1 = ...\overline{S}\ \overline{48I_o}\ \overline{P_1}\ \overline{48I_o}\ \overline{S}\ \overline{48I_o}\ \overline{P_2}....$$
$$\overline{I4S_2} = ...S\ \overline{48I_E}\ \overline{P_1}\ \overline{48I_E}\ S\ \overline{48I_E}\ \overline{P_2}....$$

For cases I and II the violation monitor will frame on the parity bits, mistaking the S bits for parity bits because the inversion of only one of the two bitstreams will cause the S bits to lose their complementary relationship, while at the same time causing the parity bits, which are normally the same, to assume a complementary relationship. This will result in a violation rate of 5 percent which is more than adequate for the violation monitor to initiate a request for a transfer to the protection channel. In cases I and II, superframe will never be found since the frame will be established on the parity bits which do not include the M$_1$ M$_2$ M$_3$ marker bits necessary to establish superframe. In case III, the violation monitor will achieve both frame and superframe because the S bits will assume the necessary complementary relationship, while the P bits will have the same polarity. However, the parity violation rate will be 100% because although the sense of the P bits will be inverted, the actual parity of an even number of information bits will be unchanged when each bit is replaced by its complement.

As we have seen, the above-described embodiment of the invention can uniquely code each channel in a four-channel system. But the DR-18 system, and other similar systems, typically include at least eight channels. To solve this problem an alternative embodiment of the invention codes the channels in the line encoder by delaying either the I4S$_1$ or the I4S$_2$ signal in selected channels by a fixed number of bits, prior to transmission. In the decoder the same delay is introduced in the signal path of the opposite bitstream, i.e., in either the I4S$_2$ or I4S$_1$ signal paths. A delay element of a given delay leads to three possible codes:

|  | X | Y |
|---|---|---|
| Code 1 | I4S$_1$ | I4S$_2$ |
| Code 2 | (I4S$_1$ + $\tau$) | I4S$_2$ |
| Code 3 | I4S$_1$ | (I4S$_2$ + $\tau$) |

A code which would be obtained by delaying both I4S$_1$ and I4S$_2$ is, of course, the same as code 1.

In the above scheme, if a trouble condition occurs where a digital bitstream crosses over into a failed channel, the resulting decoded signals will have their adjacent S bits and P bits displaced as a result of unequal delays in the two rails, as shown below:

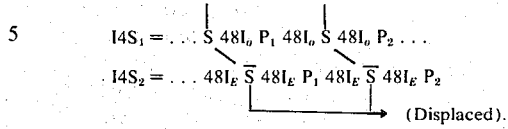

(Displaced).

This displacement will prevent the violation monitor from framing in all three cases and results in a request for a switch to the protection channel. One skilled in the art will appreciate that delay elements of different electrical lengths may also be employed which will result in nine possible codes, provided that the delay of one element is not twice the delay of the other. This third embodiment of the invention requires at least two delay elements to code each of the eight radio channels in a DR-18 system which will increase the cost of the encoders and decoders at each end of the system.

Accordingly, the preferred embodiment of the invention is to combine both the bitstream inversion technique and the delay technique to uniquely code the eight channels in a DR-18 system. Advantageously, the delay element employed introduces a delay corresponding exactly to three bits. This has been found to reduce the incidence of adjacent paired errors and only one such delay element will then be required for each channel. Using this delay technique and the invention coding technique discussed above, eight codes are available, one for each channel.

| Channel | X | Y |
|---|---|---|
| A | I4S$_1$ | (I4S$_2$ + $\tau$) |
| B | $\overline{I4S_1}$ | (I4S$_2$ + $\tau$) |
| C | I4S$_1$ | ($\overline{I4S_2}$ + $\tau$) |
| D | $\overline{I4S_1}$ | ($\overline{I4S_2}$ + $\tau$) |
| E | (I4S$_1$ + $\tau$) | I4S$_2$ |
| F | ($\overline{I4S_1}$ + $\tau$) | I4S$_2$ |
| G | (I4S$_1$ + $\tau$) | $\overline{I4S_2}$ |
| H | ($\overline{I4S_1}$ + $\tau$) | $\overline{I4S_2}$ |

FIG. 2 illustrates the implementation of this coding scheme in both the line encoder and line decoder of the DR-18 system. The particular code depicted is for channel C in the above table. As shown, a delay element 31, having a delay $\tau$, is inserted in the "rail" 12 between converter 10 and encoder 14. Rail 12 is connected to the complementary output I4S$_2$ of converter 10, rather than the normal output $\overline{I4S_2}$. At the far-end, a delay element 32, also having a delay $\tau$, and an OR-gate 33 are connected between the X output of decoder 17 and "rail" 21. An inverter 34 is connected to a second input to OR-gate 33, but is not used for channel C. An inverter 36 and an OR-gate 37 is interposed on "rail" 22 between the Y output of decoder Y and the I4S$_2$ input to converter 23. The other input to OR-gate 37 is not used for coding of channel C. FIG. 3 illustrates the analogous way in which another channel, for example channel G, is encoded.

The above proposal allows for the coding of the eight radio channels in a DR-18 system with a unique code for each channel. As previously discussed, using a separate code for each channel makes the coding independent of the channel frequency assignments. However, if the frequency assignment plan insures that a given pair of digital signals will always be carried co-channel on cross-polarized signals through the system, then only two different codes would be needed, one for vertical channels and one for horizontal channels. In this latter case, the delay method would be used to avoid the paired error problem mentioned previously. FIG. 4 illustrates one way in which the third embodiment of the invention is implemented. As shown, delay element 41, having a delay $\tau_1$, is inserted in rail 11 and delay element 42, having a delay $\tau_2$, is inserted in "rail" 12. At the far-end, delay elements 43 and 44, having delays of $\tau_2$ and $\tau_1$, respectively, are inserted in rails 21 and 22. As previously mentioned, the only restrictions on the delay element is:

$\tau_1 \neq n\tau_2$ when n = 1, 2, 3. . . .

One skilled in the art will appreciate that various substitutions and changes may be made to the arrangements of parts shown without departing from the spirit and scope of the invention.

What is claimed is:

1. In a multichannel digital transmission system of the type wherein: (a) the incoming digital bitstream associated with each channel is divided into frames, each of said frames including a first group of terminal control bits, a group of data bits, and a second group of terminal control bits; (b) $n$ such frames define a superframe; and (c) the receiving location includes monitoring means, responsive to said terminal control bits, for marking a channel bad if said terminal control bits indicate an excessive number of parity violations; a line encoder which comprises:

a series-to-parallel converter connected to the source of the incoming bitstream for generating, on two parallel bit rails, first and second bitstreams at half the rate of the incoming bitstream;

an encoder connected to said parallel bit rails for encoding said first and second bitstreams for transmission over said digital transmission system; and means, located upstream of said encoder, for inverting the sense of at least one of said first and second bitstreams whereby said channel is uniquely coded with respect to a reference channel in the same system in which neither bitstream is inverted.

2. The apparatus according to claim 1 further including means, located upstream of said encoder, for delaying either said first or said second bitstream relative to the other.

3. The apparatus according to claim 2 wherein said delaying means introduces a delay corresponding to three bit positions in said first or second bitstream.

4. In a multichannel digital transmission system of the type wherein: (a) the incoming digital bitstream associated with each channel is divided into frames, each of said frames including a first group of terminal control bits, a group of data bits, and a second group of terminal control bits; (b) $n$ such frames define a superframe; and (c) the receiving location includes monitoring means, responsive to said terminal control bits, for marking a channel bad if said terminal control bits indicate an excessive number of parity violations; a line encoder which comprises:

a serial-to-parallel converter connected to the source of the incoming bitstream for generating, on two parallel bit rails, first and second bitstream at half the rate of the incoming bitstream;

an encoder connected to said parallel bit rails for encoding said first and second bitstreams for transmission over said transmission system;

first delay means, located upstream of said encoder, for delaying said first bitstream by $\tau_1$ relative to a reference channel in the same system in which neither bitstream is delayed; and second delay means, located upstream of said encoder, for delaying said second bitstream by $\tau_2$ relative to said reference channel, where $0 \leq \tau_1$ and $\tau_2 \neq n\tau_1$ where $n = 1, 2, 3. . . .$ 5. In a multichannel digital transmission system of the type wherein: (a) the incoming digital bitstream associated with each channel is divided into frames, each of said frames including a first group of terminal control bits, a group of data bits, and a second group of terminal control bits; (b) $n$ such frames define a superframe; (c) the receiving location includes monitoring means, responsive to said terminal control bits, for marking a channel bad if said terminal control bits indicate an excessive number of parity violations; and (d) the transmitting location includes means for splitting the incoming bitstream into first and second bitstreams at half the rate of the incoming bitstream and means for inverting the sense of at least one of said first and second bitstreams; a line decoder which comprises:

a decoder for receiving the encoded bitstream from said transmitting location and generating, on two parallel bit rails, third and fourth bitstreams at half the rate of the incoming bitstream;

a parallel-to-serial converter connected to said parallel bit rails for recombining said third and fourth bitstreams into a single bitstream; and means located upstream of said parallel-to-serial converter, for inverting the sense of at least one of said third and fourth bitstreams whereby said monitoring means will mark the corresponding channel good if, and only if, the inversion performed at the receiving location is complementary to the inversion priorly performed at the transmitting location.

6. The line decoder according to claim 5 wherein said transmitting location further includes means for delaying either said first or said second bitstream relative to the other, and said line decoder further includes:

means for delaying either said third or said fourth bitstream relative to the other whereby said monitoring means will mark the corresponding channel good if, and only if, the particular combination of bitstream inversion and bitstream delay effected at the transmitting location complements the combination of bitstream inversion and bitstream delay effected in said line decoder.

7. In a multichannel digital transmission system of the type wherein: (a) the incoming digital bitstream associated with each channel is divided into frames, each of said frames including a first group of terminal control bits, a group of data bits, and a second group of terminal control bits; (b) $n$ such frames define a superframe; (c) the receiving location includes monitoring means, responsive to said terminal control bits, for marking a channel bad if said terminal control bits indicate an excessive number of parity violations; and (d) the transmitting location includes means for splitting the incoming bitstream into first and second bitstreams at half the rate of the incoming bitstream and first and second delay means for respectively delaying said first and second bitstreams by $\tau_1$ and $\tau_2$ relative to a reference channel in the same system in which neither bitstream is delayed; a line decoder which comprises:
- a decoder for receiving the encoded bitstream from the transmitting location and generating, on two parallel bit rails, third and fourth bitstream at half the rate of the incoming bitstream;
- a parallel-to-serial converter connected to said parallel bit rails, for recombining said third and fourth bitstream into a single bitstream; and
- third and fourth delay means, located upstream of said parallel-to-serial converter for respectively delaying said third and fourth bitstreams whereby said monitoring means will mark the corresponding channel good if, and only if, the bitstream delays effected by said third and fourth delay means are complementary to the delays introduced into said first and second bitstreams at the transmitting location by said first and second delay means.

* * * * *

UNITED STATES PATENT AND TRADEMARK OFFICE
CERTIFICATE OF CORRECTION

PATENT NO. : 3,990,009
DATED : November 2, 1976
INVENTOR(S) : George Howard Lentz It is certified that error appears in the above-identified patent and that said Letters Patent are hereby corrected as shown below:

Column 1, line 27, "to" should read --at--. Column 3, line 36, "000" should be in quotes. Column 3, line 37, "111" should be in quotes. Column 3, line 55, "T and Q" should read --I and Q--. Column 5, line 2, "1's" should be in quotes. Column 5, line 20 "I4S" should read --$\overline{I4S}$--. Column 5, line 29, "5" should read --50--. Column 6, line 30, "inventions" should read --inversion--. Column 7, line 4, "always" should be underscored. Column 7, line 37, in Claim 1, "series" should read --serial--.

Signed and Sealed this

Twenty-second Day of August 1978

[SEAL]

Attest:

RUTH C. MASON
Attesting Officer

DONALD W. BANNER
Commissioner of Patents and Trademarks